US011544642B2

(12) United States Patent
Falque-Pierrotin et al.

(10) Patent No.: US 11,544,642 B2
(45) Date of Patent: Jan. 3, 2023

(54) SUPPLIER RECOMMENDATION ENGINE

(71) Applicant: Shopify Inc., Ottawa (CA)

(72) Inventors: Lara Falque-Pierrotin, Paris (FR); Davide Vitiello, Berlin (DE); Yizhar Toren, Berlin (DE)

(73) Assignee: Shopify Inc., Ottawa (CA)

( * ) Notice: Subject to any disclaimer, the term of this patent is extended or adjusted under 35 U.S.C. 154(b) by 685 days.

(21) Appl. No.: 16/581,743

(22) Filed: Sep. 24, 2019

(65) Prior Publication Data

US 2021/0089939 A1    Mar. 25, 2021

(51) Int. Cl.
| | |
|---|---|
| *G06Q 10/06* | (2012.01) |
| *G06Q 10/08* | (2012.01) |
| *G06N 5/04* | (2006.01) |
| *G06N 5/00* | (2006.01) |

(52) U.S. Cl.
CPC .......... *G06Q 10/063* (2013.01); *G06N 5/003* (2013.01); *G06N 5/04* (2013.01); *G06Q 10/0835* (2013.01)

(58) Field of Classification Search
None
See application file for complete search history.

(56) References Cited

U.S. PATENT DOCUMENTS

| | | | | |
|---|---|---|---|---|
| 6,751,597 | B1 * | 6/2004 | Brodsky | G06Q 40/04 |
| | | | | 705/37 |
| 8,055,521 | B2 * | 11/2011 | Chacon | G06Q 30/00 |
| | | | | 703/2 |
| 10,810,523 | B2 * | 10/2020 | Sofranko | G06Q 10/103 |
| 10,949,209 | B2 * | 3/2021 | Li | G06F 8/443 |
| 2011/0010207 | A1 * | 1/2011 | Chacon | G06Q 10/06313 |
| | | | | 705/7.23 |
| 2019/0332981 | A1 * | 10/2019 | Sofranko | G06Q 10/08 |
| 2020/0210194 | A1 * | 7/2020 | Li | G06F 8/443 |

OTHER PUBLICATIONS

Basford, I.D., "Minimizing your energy costs," Management Accounting (British) 75.n7: p. 52, Chartered Institute of Management Accountants (CIMA), Jul. 1997-Aug. 1997). (Year: 1997).*
Mohammed, S., "Towards a Sustainable Assessment of Supplier; an Integrated Fuzzy TOPSIS-Possibilistic Multi-Objective Approach," Annals of Operation Research, https://doi.org/10.1007/s10479-03167-5, published online: Feb. 21, 2019. (Year: 2019).*

\* cited by examiner

*Primary Examiner* — Nicholas D Rosen
(74) *Attorney, Agent, or Firm* — Foley & Lardner LLP

(57) ABSTRACT

An automatic supplier recommendation engine for suggesting a product supplier from outside of an existing merchant network is disclosed. A set of optimization solutions may include pricing, performance, shipping, duties, trust score and other inventory or manufacturing factors. The set of optimization solutions are run on a processor to determine optimal fulfillment for products in an e-commerce platform. A set of heuristics may include geographic location, quality, sizing of purchases, similarity of supplier offerings, supplier positioning and other attributes may be created for merchants and suppliers. The set of optimization solutions are run, and the set of heuristics for each merchant and for each supplier are compared, to determine whether a match exists. A prospective merchant-supplier relationship may be communicated and established via an e-commerce platform.

25 Claims, 5 Drawing Sheets

SUPPLIER RECOMMENDATION ENGINE

FIELD

The present disclosure relates to methods and systems for recommending suppliers for merchant products.

BACKGROUND

Selecting a supplier within a merchant context is a multi-step process with requirements that evolve with time and changes in the numbers of customers and product volumes. Supplier selection processes are typically front loaded where a relationship must be established prior to reaching an agreement, and due to the high cost of onboarding a new supplier, it is often rare to onboard multiple suppliers at the same time. Small to medium sized merchants typically try to reduce the number of suppliers available at a time to reduce the operational overhead needed to maintain multiple supply chains.

The complexity of managing supply chains grows exponentially with every new supplier added to the supply chain, and the complexity of cross border business makes it especially difficult for small to medium sized merchants to leverage distributed regional suppliers to reduce their overhead. Large enterprises with distributed volumes implement distributed supply chain systems, but due to the changing needs of buyers, there are inefficiencies that get introduced into these systems.

What is needed in the art is a new approach for small to medium sized merchants to benefit from global distributed supply chains in a dynamically responsive manner to provide more efficient and effective supply chains.

SUMMARY

In an aspect, a computer-implemented method of generating one or more supplier recommendations for a product outside of an existing network is disclosed, including: receiving a data stream; analyzing the data stream; determining that a set of optimization solutions for one or more suppliers for the product match a set of matches of the one or more suppliers; and presenting the set of matches as one or more supplier recommendations for the product. In embodiments, the set of heuristics may be determined from input from a merchant. The set of heuristics may be determined from input from a supplier. The set of heuristics may include attributes of prospective suppliers. The set of heuristics may include attributes of prospective merchants. The set of heuristics may include geographic location of customers. The set of heuristics may include quality of products. The set of heuristics may include sizing of purchases. The sizing of purchases may include aggregated purchase history and comparison of sales against intermediate supplier positioning. The set of heuristics may include similarity of supplier offerings to the product. The set of heuristics may include aggregated purchase history. The set of heuristics may include marketing position across multiple merchants. The optimization solutions may include sale price. The optimization solutions may include shipping cost. The optimization solutions may include duties. The optimization solutions may include performance of supplier cost against cost per unit. The optimization solutions may include a trust score. The step of presenting the set of matches may include communicating the supplier to the merchant and communicating the merchant to the supplier.

In an aspect, a computer-implemented method of generating a supplier recommendation for a product outside of an existing network is disclosed, including: observing, by a decision making engine, a set of heuristics; running, by the decision making engine, a plurality of optimization solutions; and selecting, by the decision making engine, from the plurality of optimization solutions, the supplier that matches the set of heuristics. In embodiments, the set of heuristics may be determined from input from a merchant. The set of heuristics may be determined from input from a supplier. The set of heuristics may include attributes of prospective suppliers. The set of heuristics may include attributes of prospective merchants. The set of heuristics may include geographic location of customers. The set of heuristics may include quality of products. The set of heuristics may include sizing of purchases. The set of heuristics may include similarity of supplier offerings to the product. The set of heuristics may include aggregated purchase history. The sizing of purchases may include aggregated purchase history and comparison of sales against intermediate supplier positioning. The set of heuristics may include marketing position across multiple merchants. The running a plurality of optimization solutions may include sale price. The running a plurality of optimization solutions may include shipping cost. The running a plurality of optimization solutions may include duties. The running a plurality of optimization solutions may include performance of supplier cost against cost per unit. The running a plurality of optimization solutions may include a trust score. The method may include communicating the supplier to the merchant and communicating the merchant to the supplier. The set of heuristics may include at least one of merchant heuristics directed toward attributes of prospective suppliers and supplier heuristics directed toward attributes of prospective merchants; the set of heuristics may include at least one of geographic location of customers, quality, sizing of purchases, similarity of supplier offerings to the product and aggregated purchase history, the aggregated purchase history may include comparison of sales against intermediate supplier positioning; the running a plurality of optimization solutions may include at least one of sale price, shipping cost, duties, performance of supplier cost against cost per unit and a trust score; and the method may include communicating the supplier to the merchant and communicating the merchant to the supplier.

In an aspect, a system of automatically generating one or more supplier recommendations for a product outside of an existing network is disclosed, including: an e-commerce platform including at least one processor and at least one memory, the e-commerce platform adapted to: receive a data stream; analyze the data stream; determine that a set of optimization solutions for one or more suppliers for the product match a set of heuristics thereby creating a set of matches of the one or more suppliers; and present the set of matches as one or more supplier recommendations. The set of heuristics may be determined from input from a merchant. The set of heuristics may be determined from input from a supplier. The set of heuristics may include attributes of prospective suppliers. The set of heuristics may include attributes of prospective merchants. The set of heuristics may include geographic location of customers. The set of heuristics may include quality of products. The set of heuristics may include sizing of purchases. The set of heuristics may include similarity of supplier offerings to the product. The set of heuristics may include aggregated purchase history. The sizing of purchases may include aggregated purchase history and comparison of sales against intermediate supplier positioning. The set of heuristics may include similarity of supplier offerings to the product. The set of heuristics may include aggregated purchase history. The set of heuristics may include marketing position across multiple merchants. The optimization solutions may include sale price. The optimization solutions may include shipping cost. The optimization solutions may include duties. The optimization solutions may include performance of supplier cost against cost per unit. The optimization solutions may include a trust score. The step of presenting the set of matches may include communicating the supplier to the merchant and communicating the merchant to the supplier.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
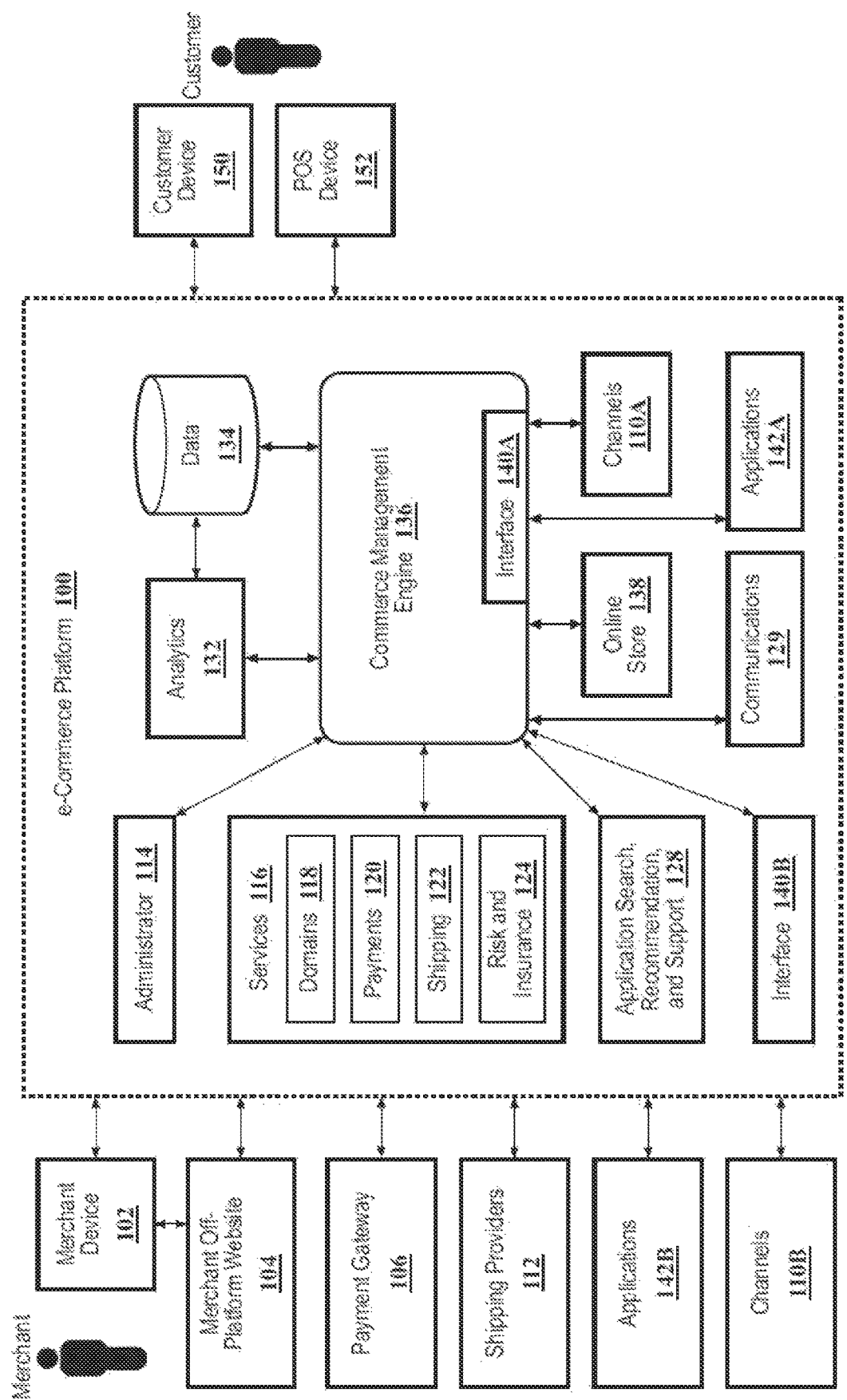
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
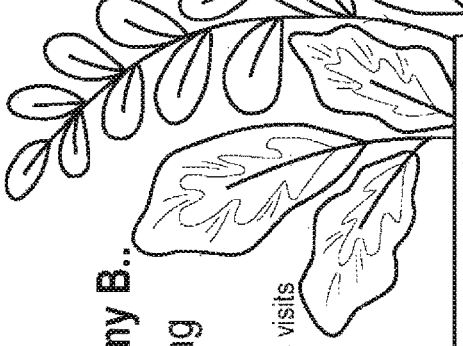
FIG. 2 depicts an embodiment of a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like). Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Given problems in the scenarios described herein, embodiments disclosed herein address the needs for recommending new suppliers. The need for recommending a new supplier may arise for a number of reasons.

By way of a hypothetical example, a British Columbia merchant may create products from locally sourced prints and items on wood, with the products being sold primarily in New York, Florida, Denmark and China. Although the merchant started as a sole creator of these products, they soon realized an alternate supply chain would be necessary to keep up with the demand or regulatory framework in different jurisdictions. The merchant and/or e-commerce platform 100 identified that the orders in Denmark and China started to soar and fulfillment was taking an inordinate amount of time. At the same time, the shipping of local wood across international borders was not something that the merchant chose to accommodate and realized that such international shipping defeated the purpose of locally sourced goods. The merchant may have contemplated shutting down international shipping altogether.

However, an alternate, prospective wood product supplier exists in Spain—one that creates similar items but has saturated their markets/territory and is unable to create the demand needed for their own products. Identification of this prospective supplier would be highly advantageous to the merchant, as the prospective supplier in Spain may be able to supplement or wholly supply the merchant's products in Denmark. As such, it would be highly beneficial if the e-commerce platform 100 could identify the prospective supplier in Spain and provide such a recommendation to the merchant.

In embodiments, the e-commerce platform may provide a recommendation (e.g. a link) to the merchant and/or the prospective Spanish supplier as to an alternate supply chain relationship between the two businesses. The recommendation may include descriptions, metrics or other information about the other party (e.g. a rating or performance score, and the like), for each party to assess the prospect of a business relationship with the other party.

Utilizing the recommendation, the merchant may realize that engaging the prospective Spanish supplier as a new supplier might meet the supply needs for Denmark. In such an example, the merchant and prospective supplier both accept the recommendation provided by the e-commerce platform, and after administrative and/or configuration actions, the European orders start automatically routing to the Spanish supplier including load balancing across the entire supplier network for the merchant.

As suggested above, in embodiments both the merchant and prospective supplier may need to participate and may accept the recommendation made by the e-commerce platform. Such participation and acceptance may be provided generally (e.g. opt-in acceptance), or may be provided on a case-by-case basis as configured on the platform by the respective party. For example, in embodiments the merchant may opt-in to participate (e.g. via a setting, a response to a recommendation or a prompt) and accept supplier recommendations provided by the e-commerce platform 100. Similarly, the prospective supplier may opt-in to participate (e.g. via a setting, a response to a recommendation or a prompt) and accept merchant recommendations from the e-commerce platform. A set of agreements (e.g. formal supply contract and the like) may be established between the merchant and the supplier.

Although the concepts described herein are generally described in relation to suppliers, it is understood that they could also equally apply to other types of businesses. Throughout the description, "supplier" is intended to include any business or entity that produces products as part of the supply chain of a merchant. Other examples include manufacturers such as Original Equipment Manufacturers (OEM), partners, distributors, franchisors and the like but can also include other merchants.

In addition, the present principles are not limited to products and may also equally be applied to services. By way of a different hypothetical example, a merchant may offer mobile massage services, and a recommendation provided by the e-commerce platform may provide a prospective supplier of mobile massage services in a different territory than that of the merchant. Such a recommendation and engagement between the two parties may expand the merchant's offering to other cities while supplementing the prospective supplier with additional revenues. Thus, during the course of business, a new regional buyer base or local merchant with similar products or services may be available to supplement or extend the merchant's offering.

In embodiments, the e-commerce platform may determine, based on various inputs, that a new prospective supplier may improve efficiencies in the supply chain (e.g. reducing the overhead, reducing returns, and the like). Such recommendations may also propose that a local third-party merchant become a local supplier thus reducing the shipping costs, return costs and/or duties for another merchant. In the end, such relationships may benefit the merchant, new supplier and ultimately the customer who purchases the product from the merchant.

There may be different types of supplier recommendations generated by the platform. In embodiments, recommendations may be made for a product or service category level (e.g. products in a general category, such as in the example above finished wood products) or for a specific level geared toward specific products (e.g. a specific wood product) or services (e.g. haircuts for men) or even for specific orders or prospective orders (e.g. a customer's order for a specific wood product). Indeed, recommendations may also be made for components, inputs, parts or portions of a product (including a service), rather than a finished product. In other embodiments, the platform can be configured to generate supplier recommendations based on a supplier recommendation preference configuration for the merchant. The merchant configuration which can be used by the platform to determine the type of recommendation and whether recommendations are to be provided (e.g. "find new suppliers") can be specific to one product (e.g. a setting associated with a product page), a product type or category (e.g. a setting associated with a product collection), a product component (e.g. a setting associated with a component listed in a product description field). Alternatively or in addition, the merchant configuration may also include a set of preferred heuristics or factors the platform should consider (details herein) when formulating recommendations. Other possibilities exist for merchant configurations.

Recommendations may also be implemented using an order routing logic which not only determines the optimal order routing using existing supplier and/or fulfillment centers, but can also determine the optimal order routing over the entire e-commerce platform 100, expanding or updating the available supplier network for each merchant. Non-optimal routing is contemplated in embodiments, with a focus on a personalized routing mechanism for each individual merchant or prospective supplier.

In embodiments, the methods and systems described herein may commence by receiving a data stream internal and/or external to the e-commerce platform 100. The data stream may be received by or in association with a decision making engine 300 or other components within the e-commerce platform 100.

In embodiments, the data stream may comprise product information, merchant information and prospective supplier information, or other pertinent information for the prospect of developing a new merchant-supplier or other relationships or expanding or changing existing relationships. The data stream may comprise heuristics for comparing prospective suppliers to the merchant information, and vice versa.

In embodiments, the decision making engine 300 may analyze the data stream and process product information, merchant information or prospective supplier information, or a combination thereof, in the form of a set of heuristics (as described in more detail herein), to determine a set of potential matches of suppliers to a merchant, and vice versa.

In embodiments, the decision making engine 300 may also determine a set of optimization solutions (as described in more detail herein), in conjunction with the potential matches of heuristics, thereby creating a set of matches of one or more suppliers for the merchant, and vice versa.

In embodiments, the set of matches may be presented to the merchant, prospective supplier(s) or other parties to thereby suggest potential merchant-supplier relationships outside of the existing network.

Figure 3:
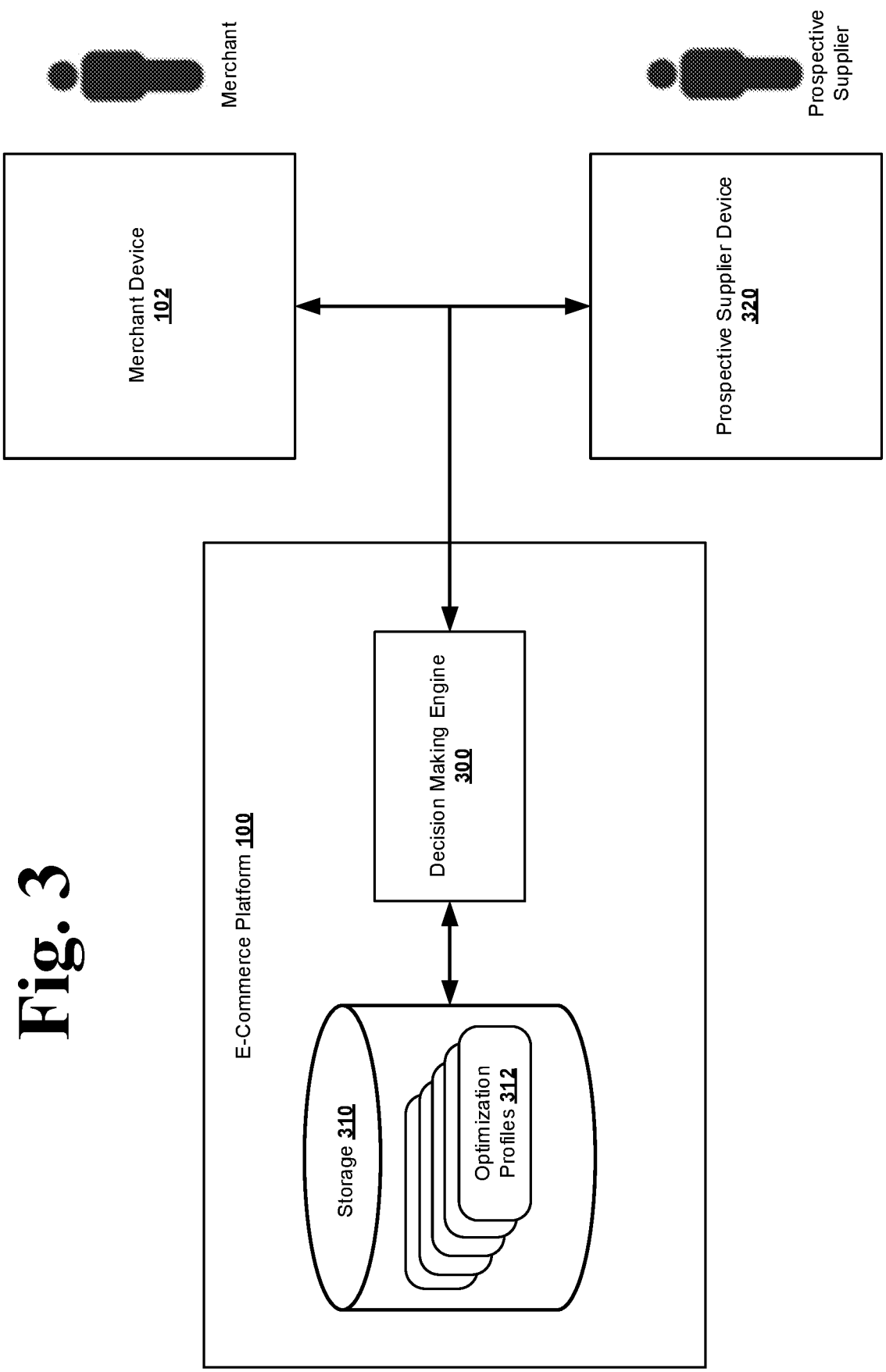
FIG. 3 depicts an embodiment functional block diagram for an e-commerce platform with a decision making engine.

In an embodiment, referring to FIG. 3, a functional block diagram illustrates computing devices and other aspects of the e-commerce platform 100 that may be utilized to identify a new or alternate supplier (such as a supplier outside of an existing supplier network or an under-utilized supplier in the network). More particularly, an e-commerce platform 102 having a decision making engine 300 is illustrated, the decision making engine 300 communicating with storage 310 containing optimization profiles 312, a merchant device 102 and a prospective supplier device 320.

In embodiments, the decision making engine 300 dynamically analyzes optimization solutions utilizing prospective suppliers (e.g. outside of an existing supplier network) to determine one or more recommended relationships between a merchant and the prospective suppliers for particular products (or services), product (or service) categories, and/or components or inputs of products (or services) that are currently offered for sale or that could be offered for sale by the merchant. More particularly, the decision making engine 300 observes a set of heuristics or attributes, runs a plurality of optimization solutions, and selects from the plurality of optimization solutions a prospective supplier that may match the set of observed heuristics. Thereafter, in embodiments the prospective supplier may be communicated to the merchant, and the merchant may be communicated to the prospective supplier. If the parties agree to the recommended relationship, the e-commerce platform 100 may be utilized to effect the new relationship and orders may be supplied and routed according to the terms of the new merchant-supplier relationship.

The decision making engine 300 may be integrated into the e-commerce platform 100 (as illustrated) or be a stand-alone computing device (not shown). The decision making engine 300 may access, store or otherwise utilize optimization profiles 312 stored in storage 310 within (as illustrated)

or outside (not shown) the e-commerce platform 100. The optimization profiles 312 may contain data such as heuristics, previously run optimization solutions, or other data to assist the decision making engine 300 in performing its tasks.

The decision making engine 300 may also communicate with a merchant device 102 and a prospective supplier device 320 to communicate a recommended prospective supplier or merchant to the other party. Further, as illustrated, a merchant may communicate through its merchant device 102 and a prospective supplier may communicate through its prospective supplier device 320, for the exchange of information or acceptance of entering into a business relationship. In embodiments, the prospective supplier may be a current supplier, such as a supplier who is under-utilized or a supplier who supplies a certain items, products or services, but may be able to supply additional items, products or services, once opportunities are identified.

In the step of observing a set of heuristics, embodiments of the decision making engine 300 may utilize a variety of heuristics or factors to determine eligible prospective relationships between merchants and suppliers, including but not limited to: revenue or profit, geographic location, quality of represented products, sizing of purchases/fulfillments, availability of products within the same product category, aggregated purchase/fulfillment history including comparison of end user purchases/fulfilments to intermediate supplier positioning, marketing position across multiple merchants/suppliers, trust score and the like.

With respect to the heuristic of revenue or profit, a decision making engine 300 may compare the profit margin or revenue a merchant generates for products (or services) supplied by an existing supplier(s) with the profit margin (or revenue) the merchant could generate for the same or similar product(s) (or services) if supplied by a prospective new supplier (or other different supplier) to determine if the profit margin (or revenue) would be higher for the merchant or prospective supplier. The profit margin (or revenue) could be determined based on any combination of volume of quantity of product(s), the merchant's sale price, the supplier's (or prospective supplier's) wholesale price, the supplier's bill of material cost, shipping and/or other ancillary costs associated with shipping the product(s) from the existing supplier (or prospective supplier) to the merchant or its customers. The same revenue or profit determination could also be applied for products (or services) the prospective supplier might sell to the merchant.

With respect to the heuristic of geographic location, a decision making engine 300 may compare the geographic location of a merchant's product fulfillment/shipping needs with that of a prospective supplier's product inventory or manufacturing location to determine whether a territory or jurisdiction match exists. The comparison could be done for one or multiple different jurisdiction levels including for example city, county, province, state, country, trade zone, etc. Alternatively, the geographic location of a merchant as to territory, citizenship or organization purposes may be compared to that of a prospective supplier to determine the legality and/or a cost associated with transport, tariffs, duties or other considerations regarding international commerce for a prospective relationship.

With respect to the heuristic of quality of represented products, a decision making engine 300 may compare the quality of represented products of a merchant's offerings to its customers with that of a prospective supplier's offerings to determine whether a match of quality of products exists. A match of the quality of represented products sold by the merchant and provided by the supplier is desirable, such that expectations of the merchant or the merchant's customers may be suitably met. Determining whether there is a quality match can be based any number of product-related characteristics stored in the e-commerce platform and which may be indicative of quality. Such characteristics may include components, inputs, portions of a product such as materials, ingredients, features, or may include product characteristics such as specification, feature, size or dimension or relate to how a product is manufactured or must be maintained such as assembly or manufacturing techniques (e.g. hand-made v. machined), cleaning requirements, etc. The decision making engine 300 may compare any number of these characteristics to determine a quality match.

With respect to the heuristic of sizing of purchases/fulfillments, a decision making engine 300 may compare the sizing of historical purchases made by the merchant against the sizing of historical fulfillments made by the prospective supplier. For example, the decision making engine 300 may compare historical purchases/fulfillments for a particular product or product category over a particular time period (e.g. weekly, monthly, annually, etc.). A match of approximate sizing of purchases/fulfillments is desirable, such that the sizing of orders between the parties will be complimentary and within the capabilities of sales/inventory offered by each party.

With respect to the heuristic of availability of products within the same product category, a decision making engine 300 may compare the category of products offered by a merchant to its customers against the category of products offered by a supplier for inventory or fulfillment. A match of availability of products with the same or a related category is desirable, such that the parties will be complimentary with respect to product development, fulfillment, customer service and support, or other business aspects relating to the common category of products.

With respect to the heuristic of aggregated purchase/fulfillment history including comparison of end user purchases/fulfilments to intermediate supplier positioning, a decision making engine 300 may compare whether a merchant or a supplier typically purchases/fulfills end user products or purchases/fulfills products that are intermediate/component products of other products. For example, the decision making engine 300 could be configured to compare the types or categories of customers the merchant and prospective supplier historically have served. If at least one type of customers is different (e.g. merchant customers include individual buyers and supplier customers include merchants or businesses), the engine 300 could determine if a match exists. This aggregated purchase/fulfillment history may be helpful to match a prospective supplier to a merchant with respect to the phase in a product supply chain that the party typically serves.

With respect to the heuristic of marketing position across multiple merchants/suppliers, a decision making engine 300 may compare the relative marketing positions of a prospective supplier against that of a merchant. In embodiments, a match of the relative marketing positions across multiple merchants/suppliers is desirable, such that the parties will be complimentary in brand recognition, goodwill and customer expectations. In embodiments, a disparity in relative marketing positions between a merchant and prospective supplier may be indicative of an opportunity. For example, a supplier without a strong brand position may benefit from suppling to a merchant with a strong brand position. In embodiments, the decision making engine 300 may be configured to compare the merchant's marketing position or effectiveness with that of the supplier which may be based at least in part on key performance indicators (KPIs) as measured by the platform across different channels. One or more of these indicators may be measured over a particular period of time (weekly, monthly, annually) and include a number or a count of customers, types of customers, orders, purchases made in response to advertising campaigns, online store visits, product or page views, countries in which products (or services) are sold and the like.

With respect to the heuristic of trust score, a decision making engine 300 may compare the relative trust scores of a merchant against a prospective supplier. A match of trust score is desirable, such that the parties will be complimentary. In embodiments, a trust score may consider prior transactions of a given merchant or supplier, ratings or reviews of a given merchant or supplier by other merchants, suppliers and customers, any complaints against the merchant or supplier, the length of time the merchant or supplier has been active on the platform 100 and the like. Trust scores may be an aggregate figure, derived from or across reviews, determined from the number of chargeback/returns, calculated from a general ratio of order and fulfilled transactions, or any other methods of calculation to determine a numeric, alphabetic or other value to represent a merchant's trustworthiness.

In the step of running a plurality of optimization solutions (e.g. for different prospective suppliers), embodiments of the decision making engine 300 may utilize a variety of variables, attributes or values to determine eligible prospective relationships between merchants and suppliers, including but not limited to: sale price, wholesale price, shipping costs, costs of duties and performance of proposed supplier, cost/cost per unit as well as any of the heuristics described herein (such as revenue or profit, geographic location, quality of represented products, sizing of purchases/fulfillments, availability of products within the same product category, aggregated purchase/fulfillment history including comparison of end user purchases/fulfilments to intermediate supplier positioning, marketing position across multiple merchants/suppliers, trust score and the like).

In embodiments, the decision making engine 300 may further select one or more favorable optimization solutions, as compared against the observed set of heuristics for existing merchant/supplier relationships, to determine if any recommended prospective relationships exist to recommend to a merchant or a prospective supplier.

In embodiments, the decision making engine 300 may further communicate a prospective supplier to a merchant, or communicate a merchant to a supplier, thus communicating one or more of the prospective merchant-supplier relationships to the parties. The decision making engine 300 may further communicate one or more reasons for the recommendation (e.g. a higher profit margin, a localized supply, better quality, better branding fit, etc.).

In embodiments, the decision making engine 300 may utilize aggregated databases such as optimization profiles 312 stored in a storage 310 to retrieve and store data to perform the above running and selection of optimization solutions. Examples of data to be stored include, but are not limited to: customer data, merchant data, supplier data, merchant heuristics, supplier heuristics, aggregated product databases and optimization databases (e.g. storage of prior optimization solutions).

Figure 4:
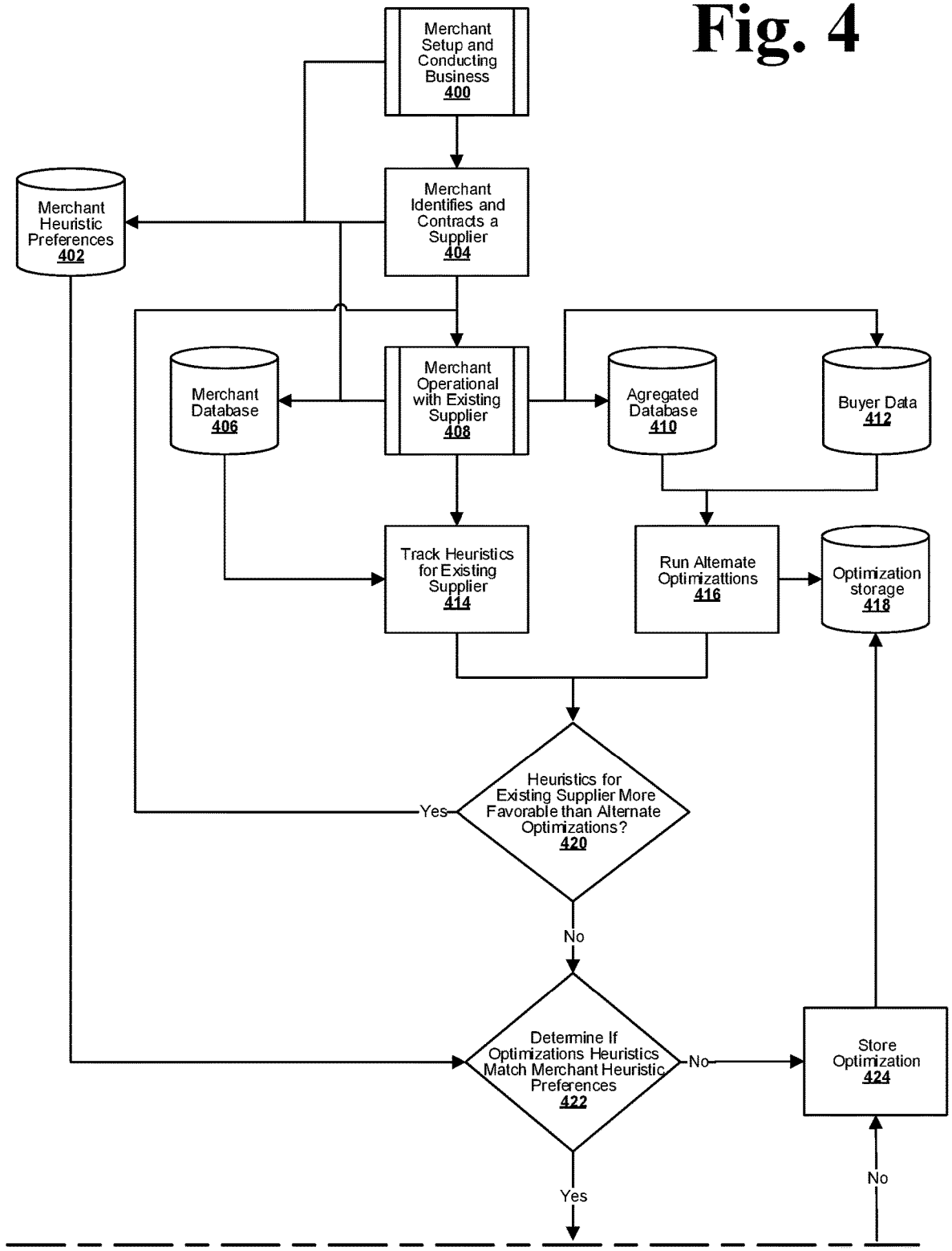
FIGS. 4 and 5 depict an embodiment for a functional-flow diagram for an e-commerce platform for recommending a supplier outside of an existing supplier network.
Figure 5:
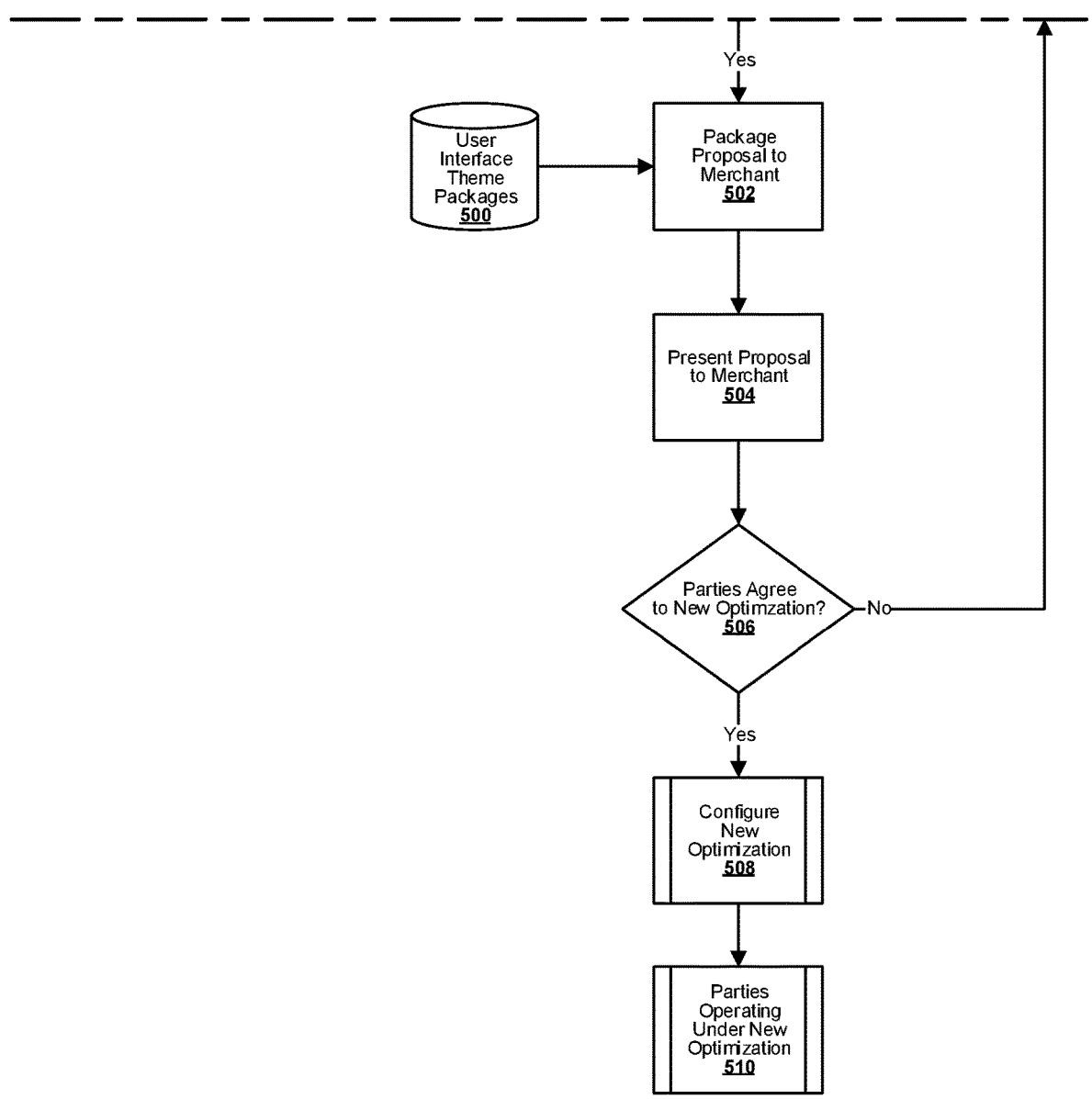

Referring to FIGS. 4 and 5, an embodiment functional-flow diagram for an e-commerce platform 100 for recommending a supplier outside an existing supplier network is illustrated.

In FIG. 4, at node 400 a merchant is setup and begins conducting business within the e-commerce platform (not shown).

At node 404, the merchant identifies and contracts a supplier to provide products. This supplier, which may or may not operate on the platform, may be considered to be within the merchant's existing supplier network. The decision making engine may be configured to receive from the merchant a set of heuristic preferences selected from the available heuristics (such as those described above) the decision making engine is configured to monitor. The preferences selected are stored in merchant heuristic preferences node 402.

At node 408, the merchant's business is operational and an existing supplier is present, as stored in merchant database node 406. Other business and transactional data relating to the merchant operations on the e-commerce platform (not shown) may be stored in a merchant database 406, an aggregated database node 410 and/or a buyer data database node 412. The aggregated databased node 410 may be configured to store suppliers that have opted-in to be considered for merchant recommendations or that the platform has otherwise identified as such as prospective suppliers for merchants.

At node 414, a decision making engine (not shown) may track the available heuristics for the existing supplier using data from the merchant database node 406. This may include determining current values (over a particular period of time) for any of the heuristics described above, including values for revenue or profit margin, number of sales/fulfilled orders, sale price, wholesale price, shipping costs, trust score, and the like.

At node 416, either serial or in parallel process with node 414, the decision making engine runs one or more alternate optimizations for one or more prospective suppliers in aggregated database 410 by tracking corresponding heuristics for those suppliers to determine if a new or alternate supplier may be recommended to the merchant. This may include determining prospective values for any of the heuristics described above, including values for revenue or profit margin, wholesale price, shipping costs, trust score and the like. The results of these alternate optimization(s) may be stored in optimization storage node 418 for subsequent utilization.

At node 420, the heuristics tracked for the current and prospective supplier(s) are compared. If the heuristics for the existing supplier are more favorable or desirable (e.g. more cost effective to fulfill given pricing, better profit margin, cheaper shipping, etc.) than the alternate optimization(s), then no action is taken to recommend an alternate supplier and the process may return to node 408 where the recommendation process may be repeated again periodically (e.g. for a new set of prospective suppliers or for the same set but over a future time period). However, at node 420 if at least one of the heuristics for the current supplier is less desirable than one or more alternate optimizations (e.g. at least one of the heuristics for at least one of the prospective suppliers is more favorable than for the current supplier), then the process continues at node 422.

At node 422, the decision making engine compares the more favorable heuristic(s) used in the alternate optimization(s) to the merchant heuristic preferences stored in node 402 and determines if there is a match. If there is no match (the more favorable heuristic(s) does not match at least one heuristic preference selected by the merchant), then the alternate optimization(s) are stored in node 424 in the optimization storage node 418.

However, if there is a match (the more favorable heuristic(s) matches at a merchant heuristic preference), then the process of recommending a prospective supplier continues in FIG. 5 at node 502.

In an alternative embodiment, the decision making engine may limit the tracking such that only heuristics that match the merchant heuristic preferences are tracked and compared. In that scenario, the operations described above for nodes 414, 416 and 420 would be limited to heuristics that match the merchant preferences stored in node 402. Other possibilities exist for selecting, tracking, comparing heuristics for supplier recommendations.

Turning to FIG. 5, the alternate optimization (e.g. prospective new supply chain for a merchant through a prospective supplier) is packaged at node 502 utilizing user interface and theme packages from node 500.

At node 504 the alternate optimization package from node 502 is communicated to the merchant. For example, this may be an electronic communication such as through a user interface on the e-commerce platform 100 (e.g. a link or dialog on a web page or user interface, and the like), or an electronic communication (e.g. email, SMS, and the like) or other communication associated with an e-commerce platform 100. In embodiments, the alternate optimization package may also be communicated to the prospective supplier.

At node 506 the merchant and/or prospective supplier may accept or reject the alternate optimization package communicated at node 504. In embodiments, this step may take the form of a formal acceptance of the recommended relationship (e.g. accepting electronically via a user interface, entering into a formal business agreement, and the like), or may be automatically accepted through a prior opt-in configuration. If acceptance is not reached by both parties, then the declined result is stored in node 424 in FIG. 4. If acceptance of the recommended relationship is accepted by both parties, then the new relationship is configured in the e-commerce platform at node 508 and the process may return to node 408 (not shown) where the recommendation process may be repeated again periodically (e.g. for a new set of prospective suppliers or for the same set but over a future time period).

At node 510, the process completes with the merchant and new supplier transacting business pursuant to the recommended alternate supply chain. Again, the recommendation process may be repeated again periodically (e.g. for a new set of prospective suppliers or for the same set but over a future time period).

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4$^{th}$ Generation (4G) networks (e.g. Long Term Evolution (LTE)) or 5$^{th}$ Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method of generating one or more supplier recommendations for a product, comprising:
    executing, by a decision making engine of a server, a first optimization solution protocol to determine that a first set of optimization solutions associated with a first set of suppliers for the product match a set of heuristics associated with a merchant, thereby creating a first subset of supplier matches from the first set of suppliers;
    while executing the first optimization solution protocol:
        monitoring, by the decision making engine of the server, a second set of optimization solutions associated with a second set of suppliers for the product;
        executing, by the decision making engine of the server, a second optimization solution protocol to determine that the second set of optimization solutions match the set of heuristics associated with the merchant, thereby creating a second subset of supplier matches from the second set of suppliers;
    presenting, by the server, the first subset of supplier matches as one or more supplier recommendations for the product; and
    presenting, by the server, the second subset of supplier matches as one or more alternative supplier recommendations for the product.

2. The computer-implemented method of claim 1 wherein the set of heuristics is determined from input from the merchant.

3. The computer-implemented method of claim 1 wherein the set of heuristics is determined from input from a supplier from the first set of suppliers or the second set of suppliers.

4. The computer-implemented method of claim 1 wherein the set of heuristics comprises attributes of prospective suppliers.

5. The computer-implemented method of claim 1 wherein the set of heuristics comprises attributes of prospective merchants.

6. The computer-implemented method of claim 1 wherein the set of heuristics comprises geographic location of customers.

7. The computer-implemented method of claim 1 wherein the set of heuristics comprises sizing of purchases.

8. The computer-implemented method of claim 1 wherein the set of heuristics comprises similarity of supplier offerings to the product.

9. The computer-implemented method of claim 1 wherein the set of heuristics comprises aggregated purchase history.

10. The computer-implemented method of claim 1 wherein the first set of optimization solutions or the second set of optimization solutions comprises sale price.

11. The computer-implemented method of claim 1 wherein the first set of optimization solutions or the second set of optimization solutions comprises shipping cost.

12. The computer-implemented method of claim 1 wherein the first set of optimization solutions or the second set of optimization solutions comprises duties.

13. The computer-implemented method of claim 1 wherein the first set of optimization solutions or the second set of optimization solutions comprises performance of supplier cost against cost per unit.

14. The computer-implemented method of claim 1 wherein the first set of optimization solutions or the second set of optimization solutions comprises trust score.

15. A computer-implemented method of generating a supplier recommendation for a product outside of an existing network, comprising:
    while a decision making engine of at least one computer is executing a first optimization solution protocol:
        observing, by the decision making engine, a set of heuristics running, by the decision making engine, a first set of optimization solutions associated with a first set of suppliers for a product to identify a first subset of supplier matches from the first set of suppliers;
        observing, by the decision making engine, a second set of optimization solutions associated with a second set of suppliers for the product;
        executing, by the decision making engine, a second optimization solution protocol to determine that the second set of optimization solutions match the set of heuristics, thereby creating a second subset of supplier matches from the second set of suppliers; and
    selecting, by the decision making engine, a supplier that matches the set of heuristics.

16. The computer-implemented method of claim 15 wherein the set of heuristics comprises attributes of prospective suppliers.

17. The computer-implemented method of claim 15 wherein the set of heuristics comprises attributes of prospective merchants.

18. The computer-implemented method of claim 15, wherein the set of heuristics comprises at least one of merchant heuristics directed toward attributes of prospective suppliers and supplier heuristics directed toward attributes of prospective merchants; wherein the set of heuristics further comprises at least one of geographic location of customers, quality, sizing of purchases, similarity of supplier offerings to the product and aggregated purchase history, wherein the aggregated purchase history comprises comparison of sales against intermediate supplier positioning; wherein running a plurality of optimization solutions considers at least one of sale price, shipping cost, duties, performance of supplier cost against cost per unit and a trust score; and further comprising communicating the supplier to a merchant and communicating the merchant to the supplier.

19. A system of automatically generating one or more supplier recommendations for a product outside of an existing network, comprising:
    an e-commerce platform comprising at least one processor and at least one memory, the e-commerce platform adapted to:
    execute a first optimization solution protocol to determine that a first set of optimization solutions associated with a first set of suppliers for the product match a set of heuristics associated with a merchant, thereby creating a first subset of supplier matches from the first set of suppliers;
    while executing the first optimization solution protocol:
        monitor a second set of optimization solutions associated with a second set of suppliers for the product;
        execute a second optimization solution protocol to determine that the second set of optimization solutions match the set of heuristics associated with the merchant, thereby creating a second subset of supplier matches from the second set of suppliers;
    present the first subset of supplier matches as one or more supplier recommendations; and
    present the second subset of supplier matches as one or more alternative supplier recommendations for the product.

20. The system of claim 19, wherein the set of heuristics is determined from input from the merchant.

21. The system of claim 19 wherein the set of heuristics is determined from input from a supplier from the first set of suppliers or the second set of suppliers.

22. The system of claim 19 wherein the set of heuristics comprises attributes of prospective suppliers.

23. The system of claim 19 wherein the set of heuristics comprises attributes of prospective merchants.

24. The system of claim 19 wherein the set of heuristics comprises geographic location of customers.

25. The system of claim 19 wherein the set of heuristics comprises sizing of purchases.

* * * * *